(12) United States Patent
Yamazaki et al.

(10) Patent No.: US 9,108,621 B2
(45) Date of Patent: Aug. 18, 2015

(54) CONTROLLING POWERTRAIN COMPONENTS FOR HILL-HOLDING IN A HYBRID ELECTRIC VEHICLE

(75) Inventors: Mark Steven Yamazaki, Canton, MI (US); Fazal Urrahman Syed, Canton, MI (US); Marvin Paul Kraska, Dearborn, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 13/465,725

(22) Filed: May 7, 2012

(65) Prior Publication Data

US 2013/0296112 A1 Nov. 7, 2013

(51) Int. Cl.
| | |
|---|---|
| *B60W 10/00* | (2006.01) |
| *B60W 10/06* | (2006.01) |
| *B60W 20/00* | (2006.01) |
| *B60W 10/08* | (2006.01) |
| *B60W 30/18* | (2012.01) |
| *B60W 30/184* | (2012.01) |

(52) U.S. Cl.
CPC .............. *B60W 10/06* (2013.01); *B60W 10/08* (2013.01); *B60W 20/00* (2013.01); *B60W 30/1843* (2013.01); *B60W 30/18118* (2013.01); *B60W 20/108* (2013.01); *B60W 2510/087* (2013.01); *Y02T 10/6286* (2013.01); *Y10T 477/26* (2015.01)

(58) Field of Classification Search
CPC ................................................ B60W 2510/087
USPC ......... 477/93, 92, 97, 98, 114, 170, 166, 171, 477/173, 71, 180, 5, 3; 310/68 C; 361/25; 290/45; 701/22
See application file for complete search history.

(56) References Cited

U.S. PATENT DOCUMENTS

| | | | | |
|---|---|---|---|---|
| 7,117,963 | B2 * | 10/2006 | Saito et al. ................... | 180/65.1 |
| 7,322,903 | B2 * | 1/2008 | Ortmann et al. ............... | 477/98 |
| 7,356,400 | B2 * | 4/2008 | Honma et al. .................. | 701/67 |
| 7,686,112 | B2 * | 3/2010 | Shiiba ...................... | 180/65.275 |
| 7,708,095 | B2 | 5/2010 | Hirata | |
| 7,743,860 | B2 * | 6/2010 | Soliman et al. .......... | 180/65.265 |
| 7,828,694 | B2 * | 11/2010 | Silveri et al. ...................... | 477/3 |
| 7,908,069 | B2 * | 3/2011 | Whitmer ........................ | 701/60 |
| 8,065,047 | B2 | 11/2011 | Hasgawa et al. | |
| 8,262,539 | B2 * | 9/2012 | Ohashi et al. .................... | 477/57 |
| 2003/0085576 | A1 * | 5/2003 | Kuang et al. ................. | 290/40 C |
| 2007/0173372 | A1 * | 7/2007 | Ueno ................................ | 477/3 |
| 2008/0210509 | A1 * | 9/2008 | Fenkart et al. ............... | 192/54.1 |
| 2009/0305844 | A1 * | 12/2009 | Klump ............................ | 477/71 |

* cited by examiner

*Primary Examiner* — Ramya Burgess
*Assistant Examiner* — David J Hlavka
(74) *Attorney, Agent, or Firm* — David B. Kelley; Brooks Kushman P.C.

(57) ABSTRACT

A hybrid electric vehicle includes an engine and a traction motor coupled to the engine by a coupling device or a clutch for providing torque to wheels of the vehicle. An inverter is electrically connected to the traction motor. A second coupling device or at least one clutch at least indirectly selectively couples the motor to the drive wheels. A controller controls the second coupling device based upon a temperature of at least one of the fraction motor and the inverter.

13 Claims, 5 Drawing Sheets

CONTROLLING POWERTRAIN COMPONENTS FOR HILL-HOLDING IN A HYBRID ELECTRIC VEHICLE

TECHNICAL FIELD

The present disclosure is directed to a hill-hold in a hybrid electric vehicle.

BACKGROUND

Hybrid electric vehicles (HEV's) include an internal combustion engine and an electric traction motor, both being capable of propelling the HEV. When the operator of the HEV desires that the vehicle remain motionless, the vehicle can be at rest with the engine either on or off. When the vehicle is at rest with the engine on, a clutch downstream of the engine can be slipped in order to keep the engine from stalling. When the vehicle is at rest with the engine off, the motor can continue to spin with the downstream clutch open, or the motor can be disabled.

While the HEV is on an incline, the engine and/or motor must work to provide power to the wheels if the operator of the HEV desires that the vehicle remain motionless. This is known as hill-hold. There exists a need for a hill-hold system that holds the HEV on an incline by more efficiently utilizing the engine and/or the traction motor to provide torque to the wheels.

SUMMARY

According to one embodiment of the present disclosure, a vehicle comprises an engine and a traction motor for providing torque to at least one drive wheel. A first coupling device, or a clutch, selectively couples the engine to the traction motor. An inverter is electrically connected to the traction motor. A second coupling device is provided that, at least indirectly, couples the traction motor to the wheels. One or more controllers are provided that communicate with various components in the vehicle. The one or more controllers are configured to control the second coupling device. The second coupling device is controlled based at least upon a temperature of at least one of the traction motor and the inverter. In one embodiment, the controller is configured to at least partially disengage the second coupling device based upon the temperature of at least one of the traction motor and the inverter exceeding a first threshold. The engine may be activated based upon the temperature exceeding the first threshold, the activation being generally simultaneous with the disengagement of the second coupling device.

According to another embodiment of the present disclosure, a hill-hold system for a vehicle is provided. The system comprises an engine and a motor for providing torque to at least one drive wheel. An inverter is electrically connected to the motor. A clutch, at least indirectly, selectively couples the motor to the wheels. A controller is also provided that activates a first drive mode and a second drive mode. In the first drive mode, the clutch is locked and the engine is disabled. In the second drive mode, the clutch is partially disengaged and the engine is activated. The controller is configured to activate the second drive mode based upon a temperature of at least one of the motor and the inverter exceeding a threshold.

According to yet another embodiment of the present disclosure, a method for controlling hill-hold of a vehicle is provided. A temperature of at least one of a traction motor and an inverter is determined. A clutch is unlocked based upon the determined temperature being above a threshold. The clutch is disposed between the traction motor and traction wheels. An engine is activated to power the wheels generally simultaneously with the unlocking of the clutch. The torque of the traction motor may also be reduced generally simultaneously with the activation of the engine. Once the temperature of the traction motor and the inverter increase above a second threshold, the clutch may be locked and the torque in the motor may be increased.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale, as some features may be exaggerated or minimized to show details of particular components. Specific structural and functional details disclosed herein are therefore not to be interpreted as limiting, but merely as a representative basis for teaching one skilled in the art to variously employ the present invention.

Figure 1:
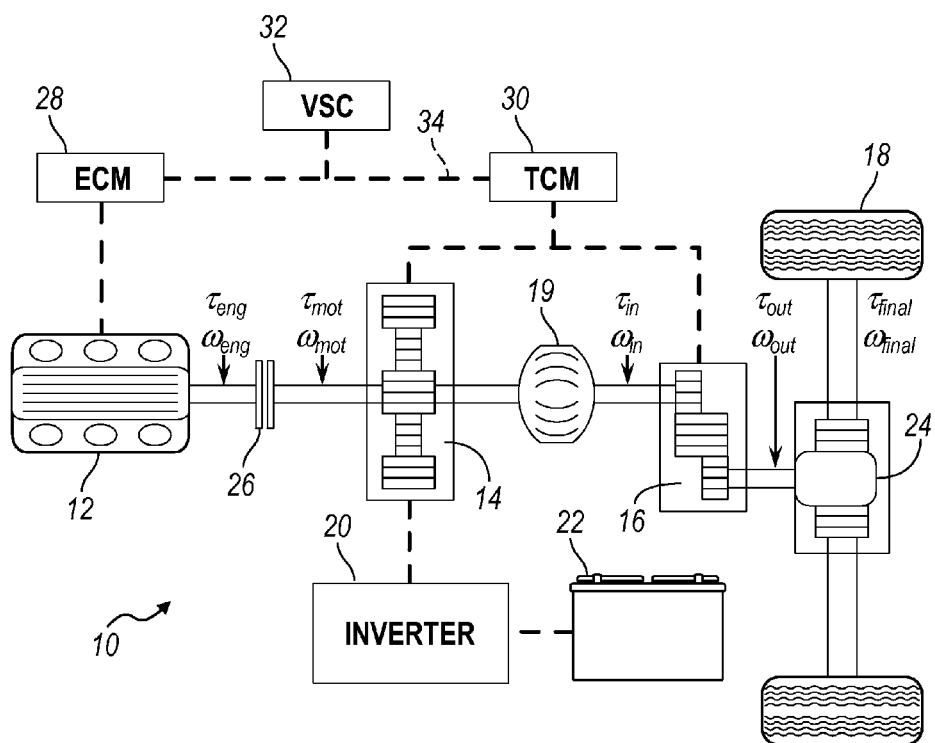
FIG. 1 is a schematic illustration of a hybrid electric vehicle according one embodiment of the present disclosure.

Referring to FIG. 1, a schematic diagram of a vehicle 10 is illustrated according to one embodiment of the present disclosure. The vehicle 10 is an HEV. The powertrain of the HEV includes an engine 12, an electric machine or motor/generator (M/G) 14, and a transmission 16 disposed between the M/G 14 and wheels 18. A torque converter 19 can optionally be provided between the M/G 14 and the transmission 16. The torque converter 19 transfers rotating power from the M/G 14 to the transmission 16. It should be understood that instead of a torque converter 19, one or more clutches can be provided to selectively transfer torque from the M/G 14 to the transmission 16.

The M/G 14 can operate as a generator in one fashion by receiving torque from the engine 12 and supplying AC voltage to an inverter 20, whereby the inverter 20 converts the voltage into DC voltage to charge a traction battery, or battery 22. The M/G 14 can operate as a generator in another fashion by utilizing regenerative braking to convert the braking energy of the vehicle 10 into electric energy to be stored in the battery 22. Alternatively, the M/G 14 can operate as a motor, in which the M/G 14 receives power from the inverter 20 and battery 22 and provides torque as an input to the torque converter 19 (or clutch), through the transmission 16 and ultimately to the wheels 18. A differential 24 can be provided to distribute torque from the output of the transmission 16 to the wheels 18.

A first coupling device, or disconnect clutch 26 is located between the engine 12 and the M/G 14. The disconnect clutch 26 can be fully open, partially engaged, or fully engaged (locked). In order to start the engine 12, the M/G 14 rotates the engine 12 when the disconnect clutch 26 is at least partially engaged. Once the engine 12 is rotated by the M/G 14 to a certain speed (e.g., ~100-200 rpm), fuel entry and ignition can commence. This enables the engine 12 to "start" and to provide torque back to the M/G 14, whereby the M/G 14 can charge the battery 22 and/or power the wheels 18 to propel the vehicle 10. Alternatively, a separate engine starter motor (not shown) can be provided.

The vehicle 10 also includes a control system, shown in the embodiment of FIG. 1 as three separate controllers: an engine control module (ECM) 28, a transmission control module (TCM) 30, and a vehicle system controller (VSC) 32. The ECM 28 is directly connected to the engine 12, and the TCM 30 can be connected to the M/G 14 and the transmission 16. The three controllers 28, 30, 32 are connected to each other via a controller area network (CAN) 34. The VSC 32 commands the ECM 28 to control the engine 12 and the TCM 30 to control the M/G 14 and the transmission 16. Although the control system of the vehicle 10 includes three separate controllers, such a control system can include more or less than three controllers, as desired. For example, a separate motor control module can be directly connected to the M/G 14 and to the other controllers in the CAN 34.

As illustrated in FIG. 1, $\tau_{eng}$ and $\omega_{eng}$ refer to the torque and speed of the engine, respectively. Furthermore, $\tau_{mot}$ and $\omega_{mot}$ refer to the torque and speed of both sides of the motor 14, respectively. $\tau_{in}$ and $\omega_{in}$ refer to the torque and speed of the input of the transmission 16, downstream of the torque converter 19, respectively, while $\tau_{out}$ and $\omega_{out}$ refer to the torque and speed of the output of the transmission 16. The final torque and speed transmitted to the wheels 18 is represented by $\tau_{final}$ and $\omega_{final}$, downstream of the engagement with the differential 24.

Figure 2:
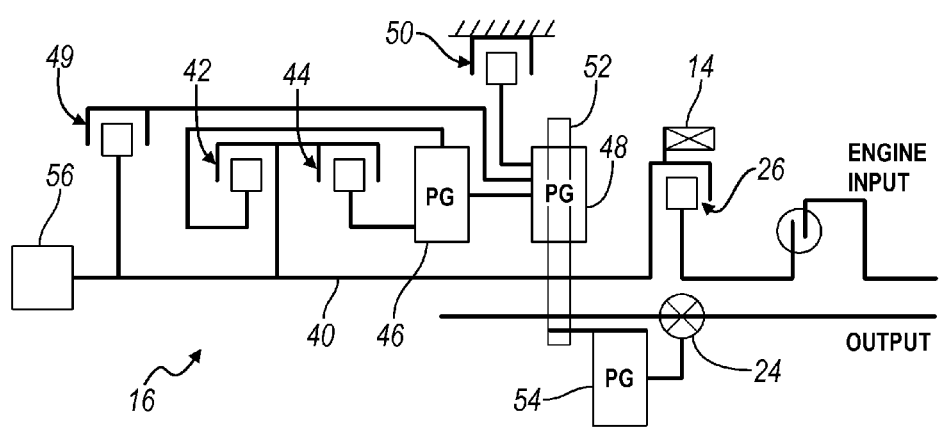
FIG. 2 is a schematic illustration of a transmission and other driveline components of a hybrid electric vehicle according to one embodiment of the present disclosure.

Referring to FIG. 2, the transmission 16 is shown in detail. It should be understood that FIG. 2 merely exemplifies one configuration of a transmission 16. In a vehicle 10 utilizing the exemplified configuration of FIG. 2, a torque converter may not be needed in the vehicle, due to the multiple clutches and planetary gearsets within the transmission. It should therefore be understood that a simplified transmission 16 can be utilized in combination with a torque converter, in which fewer clutches and planetary gearsets are needed within the transmission 16. Several other embodiments are contemplated with various configurations of clutches and/or planetary gearsets, with or without the use of a torque converter, as known in the art.

The transmission 16 of FIG. 2 includes an input shaft 40 that receives torque from the engine 12 and the M/G 14 either separately or in combination. The input shaft 40 is operatively connected to a second clutch 42 and a third clutch 44. A portion of each of the second clutch 42 and third clutch 44 is connected to a first planetary gearset (PG) 46, which is connected to a second planetary gearset (PG) 48. A reverse clutch, or fourth clutch 49 and a low-and-reverse brake, or fifth clutch 50 can also be connected to the PG 48. The second PG 48 drives a belt or chain 52 to transmit power to a third planetary gearset (PG) 54. Each of the planetary gearsets 46, 48, 54 can include a sun gear, a ring gear, and a planetary carrier to provide various gear ratios in the transmission 16.

The third PG 52 provides a final gear ratio to transmit torque from the transmission 16 to the differential 24.

A pump 56 provides pressure to each of the clutches to engage/disengage each clutch as dictated by the TCM 30. It should be understood that one or more of the clutches 42, 44, 49, 50 can be controlled to be engaged (locked), partially engaged, or fully disengaged, similar to the operation of the disconnect clutch 26. For example, when the second clutch 42 and/or the third clutch 44 are disengaged, the transmission 16 can be isolated from the M/G 14 such that no torque is transmitted through the transmission 16 and to the wheels 18. It should also be understood that while clutches 42, 44 are illustrated as being a part of the transmission 16, one or more clutches can be separately utilized between the M/G 14 and the transmission 16 instead of being integral with the transmission 16.

Referring to FIGS. 1-2, the engine 12 and M/G 14 can individually or together work to provide a relatively small amount of power to the wheels 18 to maintain the vehicle 10 motionless on an incline. This is hereinafter referred to as a hill-hold. When an operator of the vehicle 10 is stopped or idled on an incline, a release of the brake pedal should not enable the vehicle 10 to begin rolling backwards. The engine 12 and/or M/G 14 can provide torque to the wheels 18 to either maintain the vehicle 10 in a motionless state, or, if the incline is relatively small, provide a small amount of forward motion or "creeping" to the vehicle 10.

During hill-hold, if the M/G 14 is providing the necessary torque to the wheels 18 without the engine 12 activated, a coupling device or clutch downstream of the M/G 14 can be locked such that the torque is transferred through the transmission 16 and to the wheels 18. At a particular moment, as will be discussed further, the clutch can be unlocked such that the engine 12 can be activated by the M/G 14 and begin to provide torque to the wheels and continue the hill-hold. The present disclosure provides a system that determines whether to use the engine 12 or M/G 14, and when to lock or unlock the clutch in order to provide hill-hold functionality. While references in the present disclosure are made to a "clutch" or a "coupling device" that is locked or unlocked during hill-hold, it should be understood that the "clutch" or "coupling device" can refer to one or more clutches downstream of the M/G 14 that, at least indirectly, couple the M/G 14 to the wheels 18 such that torque from the M/G 14 is translated into power at the wheels 18. For example, the clutch can be any clutch in the transmission 16, such as clutches 42 and 44. The clutch can also be a bypass clutch in the torque converter 19, or a clutch disposed between the M/G 14 and transmission 16 if a torque converter 19 is not included in the vehicle 10. Furthermore, the clutch can also refer to the combination of the torque converter 19 and the transmission 16. In all references hereinafter in the present disclosure to a "clutch", it should be understood that any of the above-referenced clutches or combinations of clutches are contemplated unless otherwise indicated.

Figure 3:
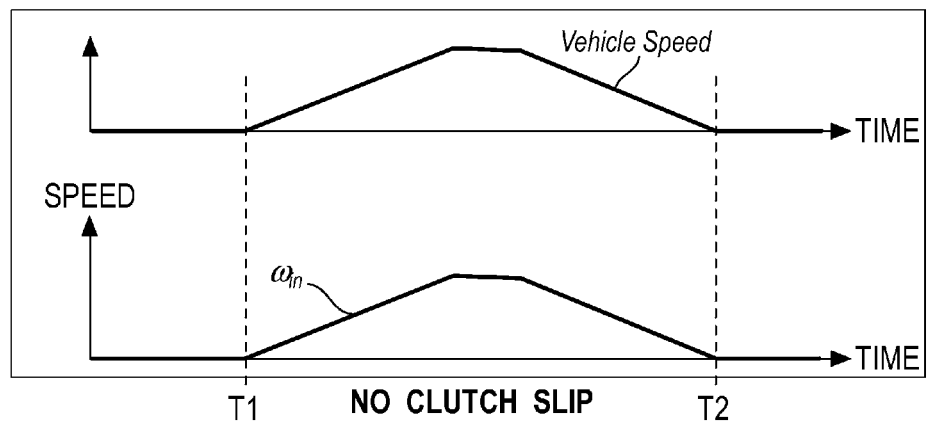
FIG. 3 is a graph illustrating an example of vehicle speed and transmission input speed over time when a clutch is locked.

Referring to FIG. 3, a graph is provided that illustrates an example of an electric mode of operation in which the M/G 14 propels the vehicle 10 and the engine 12 is disabled. As shown in FIG. 3, the input speed ($\omega_{in}$) of the transmission 16 and the speed of the vehicle 10 resemble one another. This is due to the clutch being locked and not slipping. Before time T1 and after time T2, the vehicle has a speed of 0 mph. This indicates that the vehicle is either stopped or idling, and either on a flat surface or on an incline. It is during these times that the engine 12, M/G 14 and clutch downstream of the M/G 14 must be controlled if the torque of the engine 12 is needed to maintain the hill-hold.

Figure 4:
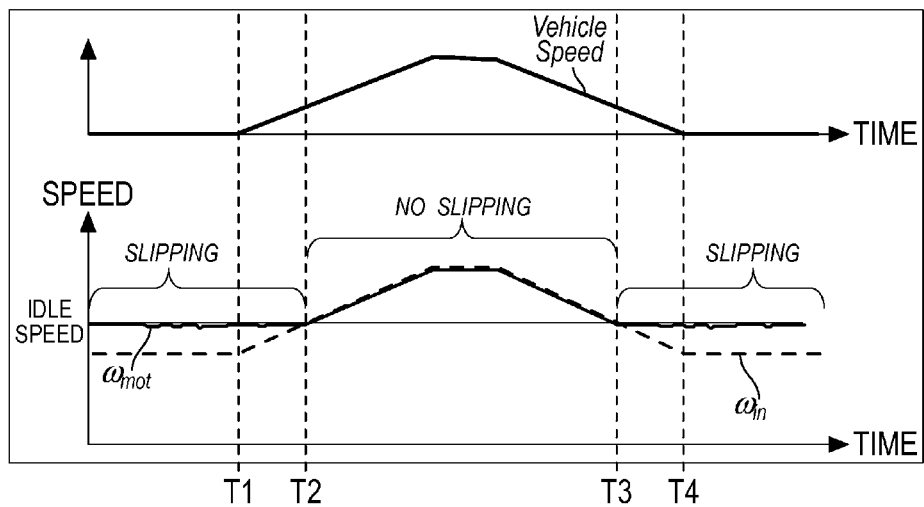
FIG. 4 is a graph illustrating an example of vehicle speed and transmission input speed over time while a clutch transitions between slipping and not slipping.

Referring to FIG. 4, an alternate embodiment is provided that illustrates an example in which the clutch alternates between slipping and not slipping during vehicle travel. In this case, the M/G 14 is allowed to spin at a predetermined speed or "idle speed" when the vehicle 10 is at rest. Before T1, the vehicle 10 is motionless, the M/G 14 is spinning, the clutch is slipping. It should be noted that in this illustrated embodiment, since the speed of the input of the transmission 16 ($\omega_n$) is positive, the clutch that is slipping is a clutch downstream of the torque converter 19. The clutch can thus be clutch 42, 44 in the transmission, for example.

At point T1, the input speed of the transmission 16 increases as the vehicle beings to be propelled. The pressure in the clutch can increase, but the clutch is still slipping between times T1 and T2. The vehicle 10 can be creeping, for example, between times T1 and T2. At time T2, the clutch is locked and the input speed of the transmission 16 resembles the speed of the vehicle 10. Between times T2 and T3, the vehicle 10 travels with no clutch slip such that the changes in the M/G 14 correspond to changes in the input speed of the transmission 16 which, in turn, corresponds to changes in the vehicle speed. At time T3, the clutch unlocks and beings to slip, while the speed of the M/G 14 returns to idle speed and the input speed of the transmission 16 continues to decrease as the vehicle 10 slows to a stop. At time T4, the vehicle 10 is again stopped with the M/G 14 spinning and the clutch slipping.

As previously disclosed, the vehicle 10 must remain motionless with minimal disturbances for a satisfactory hill-hold. Therefore, during hill-hold, a control system must be provided when the engine 12 is needed to be activated or the torque at least increased, as previously described. An example of such a system will now be described with reference to FIGS. 5-7.

Figure 5:
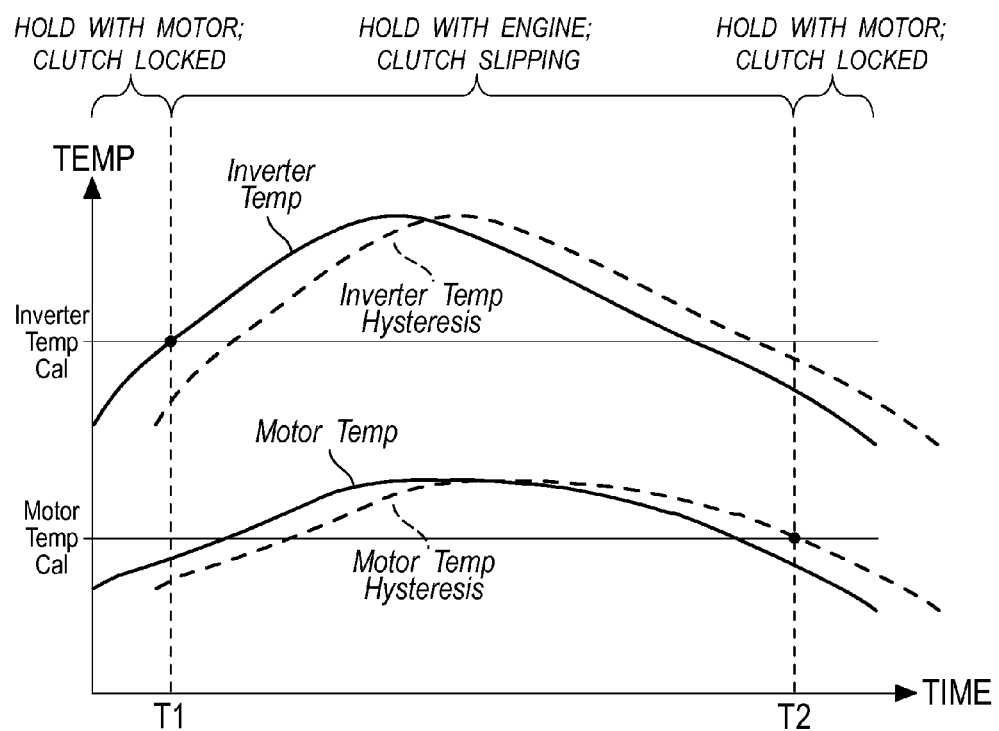
FIG. 5 is a graph illustrating inverter temperature and motor temperature during times in which at least one of the motor and engine are holding the vehicle on a hill according to one embodiment of the present disclosure.

Referring to FIG. 5, the temperature of the M/G 14 ("motor temp") as well as the temperature of the inverter 20 ("inverter temp") are illustrated during a hill-hold cycle. For each of the inverter temp and the motor temp, a hysteresis line is also provided. The "inverter temp hysteresis" and the "motor temp hysteresis" represent time-delayed data as a function of the inverter temp and motor temp data, respectively.

Before time T1, hill-hold is accomplished with the M/G 14 and the engine 12 deactivated with the clutch locked. The temperature of the inverter 20 and the M/G 14 continues to increase as hill-hold is accomplished by the M/G 14 due to the flow of electric power from the battery 22 to the M/G 14.

At time T1, the temperature of the inverter 20 has increased above a predetermined calibrated inverter temperature ("Inverter Temp Cal"). This calibrated temperature is preferably greater than 200° F., but can be any calibrated to any temperature in which a threat of heat damage can be present. At T1, the clutch is slipped to off-load the heat from the M/G 14. In order to supplement the power demands at the wheels 18 for hill-hold purposes while the clutch is slipped, the engine 12 is activated at T1. The activation of the engine 12 and the slipping of the clutch occurs generally simultaneously, preferably within a fraction of a second. Once the engine 12 is activated, the clutch is opened or slipped such that the speed transmitted is no lower than the engine's 12 idle speed to prevent the engine 12 from stalling.

Between times T1 and T2, the engine 12 continues to provide the necessary torque through the powertrain to maintain the vehicle 10 in a hill-hold. As the engine 12 remains activated, the M/G 14 and the inverter 20 cool down due to their inactivity. The engine 12 is able to provide torque to the wheels 18 for a hill-hold. The engine 12 can also provide the necessary power to charge the battery 22 if needed, in the manner as previously disclosed.

At time T2, the inverter temp hysteresis has decreased below the predetermined calibrated inverter temperature amount, and the motor temp hysteresis has decreased below the predetermined calibrated motor temperature amount. It should be understood that the calibrated inverter temperature value and the calibrated motor temperature value can be different when the engine 12 is on as opposed to the engine 12 being off. In other words, the calibrated temperature values for the inverter and motor can be lower or higher when the inverter 20 and M/G 14 are cooling than when the inverter 20 and M/G are heating.

When both of the inverter and motor temp hysteresis values have decreased below the calibrated values at time T2, the temperatures of the inverter 20 and M/G 14 are determined to be at a safe temperature such that the clutch can lock and the M/G 14 can again work to provide the necessary torque for a hill-hold. After time T2, the inverter temp and the motor temp rise again, due to the work provided to hold the vehicle 10 on an incline.

Figure 6:
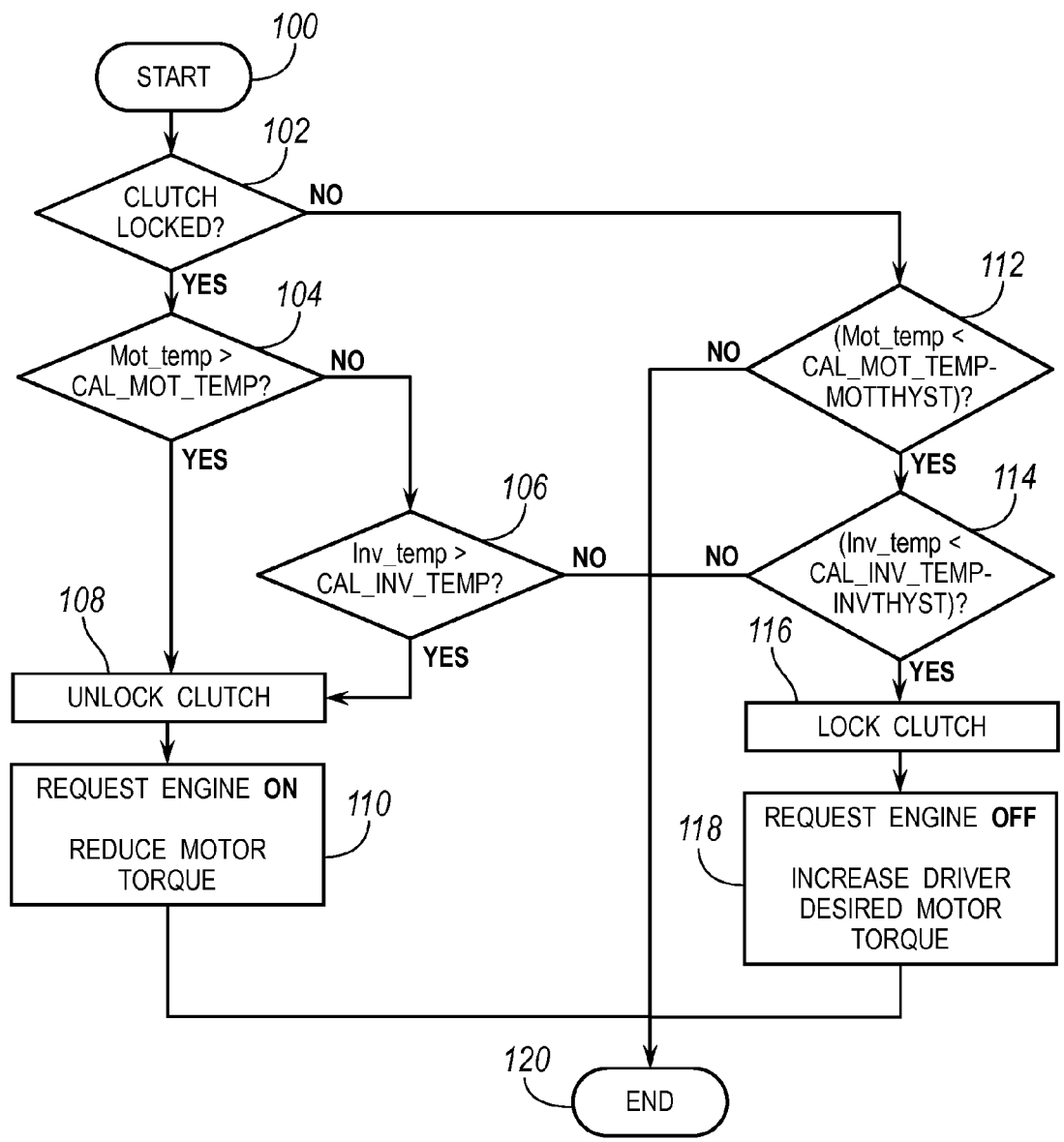
FIG. 6 is a flowchart illustrating a method according to one embodiment of the present disclosure.

Referring to FIG. 6, one example of a method of a hill-hold is provided in which the clutch can be locked and the M/G 14 is at 0 mph while the vehicle 10 is at rest. The VSC 32 and other controllers implement the illustrated example. The method begins at step 100. At step 102, a determination is made as to whether the clutch is locked. If the clutch is locked, a determination is made as to whether the temperature of the M/G 14 is above the predetermined calibrated motor temperature at step 104. If not, then a determination is made as to whether the temperature of the inverter 20 is above the predetermined calibrated inverter temperature at step 106. If either temperature is above respective predetermined values, the clutch is unlocked at step 108. At step 110, which can be generally simultaneous with step 108, a request is made to pull-up and activate the engine 12, and the torque of the M/G 14 is reduced. This allows the M/G 14 and the inverter 20 to cool while not providing torque to the wheels 18.

If the clutch is locked as determined at step 102, then at step 112 a determination is made as to whether the temperature of the M/G 14 is less than the calibrated motor temperature hysteresis. If so, then a determination is made as to whether the temperature of the inverter 20 is less than the calibrated inverter temperature hysteresis at step 114. If a positive determination is made at steps 112 and 114, the temperature of both the M/G 14 and the inverter 20 has reached a safe limit such that the M/G 14 can be increased in torque to provide hill-hold. At step 116, the clutch is locked. At step 118, which can be simultaneous with step 116, a request is made to disable the engine, and the torque of the M/G 14 is increased to provide hill-hold. The method ends at 120, at which time the method can repeat again at step 100.

Figure 7:
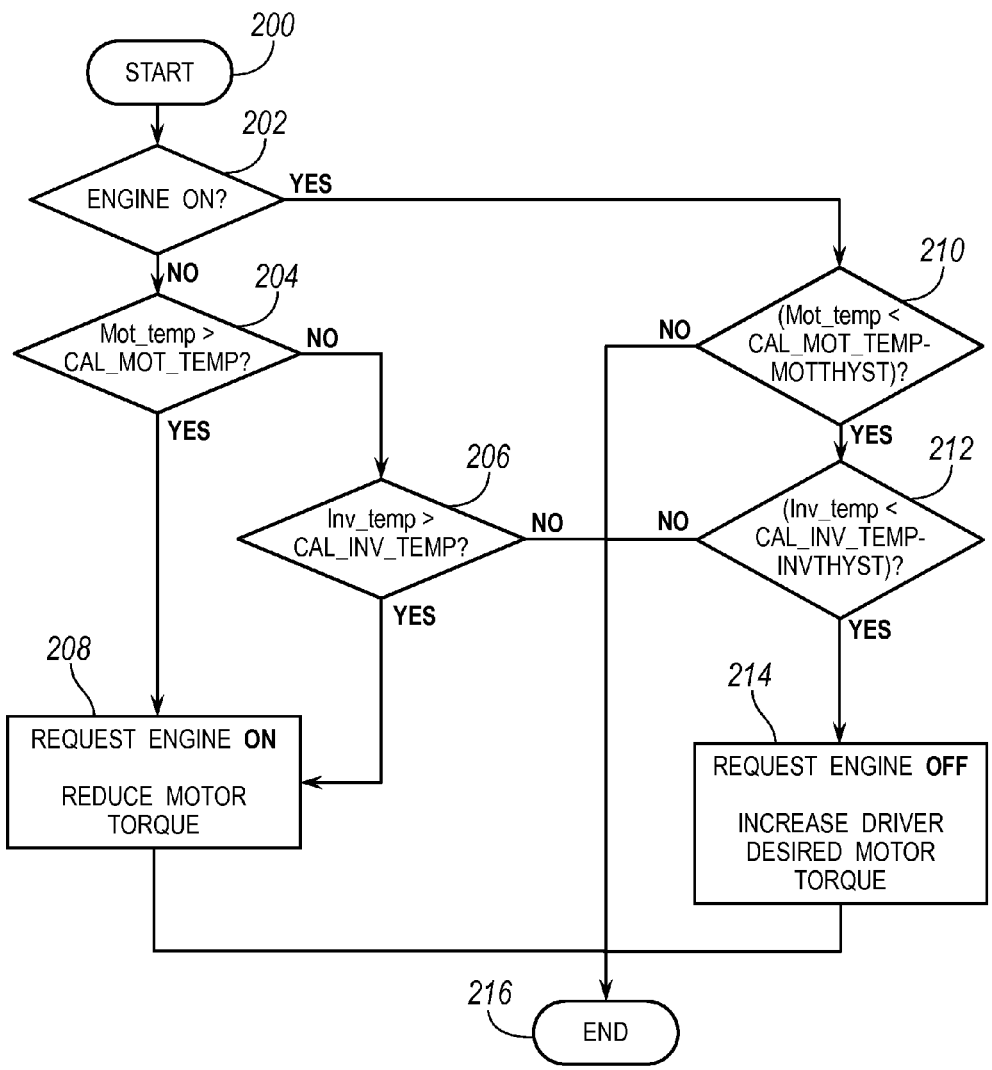
FIG. 7 is a flowchart illustrating another method according to one embodiment of the present disclosure.

Referring to FIG. 7, another example of an algorithm for a hill-hold is provided, in which the M/G 14 remains spinning while the vehicle 10 is at rest. The VSC 32 and other controllers implement the illustrated example. The method begins at step 200. At step 202, a determination is made as to whether the engine 12 is activated. If the engine 12 is not activated, then at step 204 a determination is made as to whether the temperature of the M/G 14 is above the predetermined calibrated motor temperature value. If the M/G 14 is not too hot, a determination is made at step 206 as to whether the inverter 20 is too hot (i.e., the temperature of the inverter 20 is above the predetermined calibrated inverter temperature. If a positive determination is made at either steps 204 or 206, then at step 208 a request is made to activate the engine 12 as well as reduce the torque of the M/G 14. The engine 12 thus accomplishes the hill-hold while the M/G 14 and inverter are cooled.

If the engine was determined to be activated at step 202, then at step 210 a determination is made as to whether the temperature of the M/G 14 is less than the calibrated motor temperature hysteresis. If so, then a further determination is made as to whether the temperature of the inverter 20 is less than the calibrated inverter temperature hysteresis at step 212. If a positive determination is made at steps 210 and 212, the temperature of both the M/G 14 and the inverter 20 has reached a safe limit such that the M/G 14 can be increased in torque to provide hill-hold. Thus, the engine is disabled at step 214 at the torque of the M/G 14 is increased to provide the necessary torque to the wheels 18.

While exemplary embodiments are described above, it is not intended that these embodiments describe all possible forms of the invention. Rather, the words used in the specification are words of description rather than limitation. It is also contemplated that various embodiments of the present disclosure may be combined or rearranged to achieve a specific result. Furthermore, to the extent that particular embodiments described herein are described as less desirable than other embodiments or prior art implementations with respect to one or more characteristics, the other embodiments and the prior art implementations are not outside the scope of the disclosure and may be desirable for particular applications.

What is claimed is:

1. A vehicle comprising:
an engine;
a traction motor;
a first coupling device for selectively coupling the engine to the traction motor;
an inverter electrically connected to the traction motor;
a second coupling device for selectively coupling the traction motor to the wheels; and
a controller configured to at least partially disengage the second coupling device and activate the engine based upon a temperature of at least one of the traction motor and the inverter.

2. The vehicle of claim 1, wherein the controller is configured to at least partially disengage the second coupling device in response to the temperature of at least one of the traction motor and the inverter exceeding a first threshold.

3. The vehicle of claim 2, wherein the controller is further configured to lock the first coupling device and activate the engine in response to the temperature exceeding the first threshold.

4. The vehicle of claim 3, wherein the controller is further configured to lock the second coupling device in response to the temperature of both of the traction motor and the inverter being below a second threshold.

5. The vehicle of claim 4, wherein the controller is further configured to deactivate the engine in response to the temperature of both of the traction motor and the inverter being below the second threshold.

6. The vehicle of claim 1, wherein the controller is further configured to control the first coupling device in response to the temperature of at least one of the traction motor and the inverter.

7. The vehicle of claim 1, wherein the second coupling device is a torque converter disposed between the traction motor and the wheels.

8. The vehicle of claim 1, wherein the second coupling device is a clutch disposed between the traction motor and the wheels.

9. A hill-hold system for a vehicle comprising:
an engine;
a motor for providing torque to wheels;
an inverter electrically connected to the motor;
a clutch for selectively coupling the motor to the wheels; and
a controller configured to:
activate a first drive mode in which the clutch is locked and the engine is off,
activate a second drive mode based upon a temperature of at least one of the motor and the inverter exceeding a threshold, wherein in the second drive mode the clutch is partially disengaged and the engine is on, and
subsequent to activating the second drive mode, activate the first drive mode based upon the temperatures of the motor and the inverter reducing below the threshold.

10. The system of claim 9, further comprising a second clutch disposed between the engine and the motor for selectively coupling the engine to the motor.

11. The system of claim 9, wherein the controller is further configured to activate the first drive mode based upon the temperature of both of the inverter and the motor being below a second threshold.

12. The system of claim 9, wherein the clutch is disposed within a transmission such that the motor selectively provides torque through the transmission and to the wheels.

13. A vehicle comprising:
an engine;
a traction motor for providing torque to wheels;
a first coupling device for selectively coupling the engine to the traction motor;
an inverter electrically connected to the traction motor;
a second coupling device for selectively coupling the traction motor to the wheels; and
a controller programmed to control the first and second coupling devices based upon a temperature of at least one of the traction motor and the inverter.

* * * * *